United States Patent [19]
Sato et al.

[11] 3,757,292
[45] Sept. 4, 1973

[54] SAFETY SYSTEM FOR VEHICLE DRIVER AND PASSENGERS

[75] Inventors: Kazuo Sato; Takami Aoyama, both of Toyota, Japan

[73] Assignee: Toyota Jidosha Kogyo Kabushiki Kaisha, Toyota, Japan

[22] Filed: May 7, 1971

[21] Appl. No.: 141,333

[30] Foreign Application Priority Data
Dec. 5, 1970 Japan.............................. 45/107832

[52] U.S. Cl......... 340/52 H, 123/198 DC, 180/103, 200/81.4, 340/60
[51] Int. Cl............................................. B60r 21/03
[58] Field of Search............... B60q/1/00; 340/52 H, 340/60; 180/103; 280/150 AB; 200/81.4, 81 R; 123/198 D, 198 DC

[56] References Cited
UNITED STATES PATENTS
3,642,303  2/1972  Irish et al. .................... 250/150 AB
2,899,214  8/1959  D'Antini...................... 250/150 AB
2,096,291  10/1937  Tanner................................ 180/103
3,410,359  11/1968  Mollison ............................ 180/103
2,337,838  12/1943  Reavis.......................... 123/198 DC
2,749,536  6/1956  Sperling............................ 200/81.4

*Primary Examiner*—John W. Caldwell
*Assistant Examiner*—Glen R. Swann, III
*Attorney*—Cushman, Darby & Cushman

[57] ABSTRACT

A safety system for vehicle driver and passengers includes a bladder or bladders expansible by gaseous pressure fed from a gas reservoir in the event of a collision to protect the driver and passengers. The system also includes an electric switch operable in response to the pressure drop in the gaseous pressure in the reservoir to break electrical connection between the electrical power source and wiring systems leading to various vehicle electrical components to prevent short-circuits in the wiring systems and to guard against fires in the event of such collision.

17 Claims, 3 Drawing Figures

PATENTED SEP 4 1973　　3,757,292

INVENTORS

KAZUO SATO
TAKAMI AOYAMA

BY Cushman, Darby & Cushman
ATTORNEYS

SAFETY SYSTEM FOR VEHICLE DRIVER AND PASSENGERS

BACKGROUND OF THE INVENTION

1. Field of the Invention

The present invention relates generally to a safety system for protecting vehicle driver and passengers in the event of a collision of the vehicle with another object and, more particularly, to an electric switch operable in response to variation in the pressure in the pressure source for the system to prevent shortcircuits in the wiring systems of the vehicle and to guard against accidental fires in the event of such a collision.

U.S. Pat. application Ser. No. 70,692, titled "Safety Method and Apparatus for Vehicle Passengers," filed on Sept. 10, 1970 by Hisatsune Tomio discloses a safety system for protecting driver and passengers in a vehicle in the event of a collision of the vehicle with another vehicle or other object. As is disclosed in the patent application mentioned, a safety system of this kind usually comprises means for detecting or predicting such a collision, a pressure source or reservoir containing a gas under high pressure, a gas bladder expansible by the gaseous pressure fed from the pressure source and valve means operable in response to a collision signal from the collision detecting means to communicate the pressure source with the gas bladder. It is necessary that the expansion of the gas bladder be completed within an extremely short period of time such as less than several tens of milli-seconds as measured from the instant that a collision of the vehicle with another object accidentally takes place to the instant that the vehicle driver and/or passengers are thrown forwardly against relatively hard materials in the compartment. For this purpose, the gas reservoir should contain a fluid under remarkably high pressure such as more than 100 atm. In a case where the pressure within the reservoir should inadvertently be lowered below a predetermined pressure level, there is a possibility that the gas bladder is not expanded either at a sufficient rate or completely so that the system fails to well operate to protect the driver and passengers even if the valve means are well operated in response to a collision signal from the collision detector. Thus, it should be confirmed that the pressure source for the safety system is kept at or above a predetermined pressure level.

In addition, a vehicle has various kinds of electrical components and wiring systems extending between the electrical components and power source. In the event of collisions, there often take place short circuits in the wiring systems which produce sparks which in turn burn not only the wiring systems per so but also the fuel for the vehicle engine to produce accidental fires. As such, it is desired that, in the event of a collision, not only the vehicle driver and passengers are protected from being driven by inertia against hard objects in the compartment but also the vehicle per se is guarded against accidental fires.

SUMMARY OF THE INVENTION

It is a first object of the present invention to provide an improved safety system for vehicle driver and passengers which is operable in the event of a collision to protect the driver and passengers from being thrown against hard objects in the compartment.

It is a second object of the present invention to provide a safety system of the kind specified in the preceding paragraph and which is operable to break the electrical connection between the electrical power source for the vehicle and the wiring systems therein to prevent shortcircuits in the wiring systems and to guard the vehicle against accidental fires.

It is a third object of the present invention to provide a safety system of the kind specified in the preceding paragraph and which is operable to warn the driver of an abnormal pressure level of the pressure source for the safety system before the start, and even during the operation, of the vehicle.

It is a fourth object of the present invention to provide a safety system of the kind specified in the preceding paragraph and which is operable not to allow the vehicle to be inadvertently started when the pressure source for the safety system is in abnormal state.

It is a fifth object of the present invention to provide a safety system of the kind specified in the preceding paragraph and which includes means manually operable by the driver to reset the safety system from the position in which the vehicle is not allowed to start, as discussed in the preceding paragraph, to a position in which the vehicle is allowed to start even if the pressure source for the safety system is at a pressure level below a predetermined value.

According to one aspect of the present invention, there is provided a safety system for vehicle driver and passengers, said system including a reservoir containing a pressurized fluid, an expansible gas bladder, a conduit extending between said reservoir and said gas bladder, means for detecting a collision of the vehicle with another object, valve means in said conduit electrically connected to said collision detecting means, the latter being adapted to emit an electrical signal in the event of a collision, said valve means being adapted to be opened in response to such electrical signal to allow the pressurized fluid to flow from said reservoir through said valve means to said gas bladder so that the same is expanded to protect the driver and passengers, an electric switch means having at least a pair of electrical contacts one of which is electrically connected to the electrical power source of said vehicle, the other contact being movable between a first position in which said other contact is in electrically conductive contact with said one contact and a second position in which said the other contact is spaced apart from said one contact, said the other contact being electrically connected to wiring systems in the vehicle, said the other contact being normally in said first position to allow the electrical current to pass from said power source to said wiring systems, means in fluid-flow communication with said reservoir and responsive to variation in the pressure in said reservoir to move said the other contact from said first position to said second position to thereby break the electrical connection between said power source and said wiring systems.

According to another aspect of the present invention, there is provided an electric switch for use with a safety system for vehicle driver and passengers, said system including a gas bladder adapted to be expanded by a gaseous pressure from a reservoir to protect the driver and passengers in the event of a collision with another object, said electric switch comprising at least one pair of electrical contacts one of which is electrically connected to the electrical power source of said vehicle, the other contact being movable between a first position in which said the other contact is in electrically conductive contact with said one contact and a second position in which said the other contact is spaced apart from said one contact, said the other contact being electrically connected to wiring systems in said vehicle, said the other contact being normally in said first position to allow the electrical current to pass from the power source to said wiring systems, means in fluid-flow communication with said reservoir of said safety system and responsive to variation in the pressure in said reservoir to move said the other contact from said first position to said second position to thereby break the electrical connection between said power source and said wiring systems, and a substantially closed hollow casing enclosing said electrical contacts and said pressure variation responsive means.

As will be seen from the above, the electric switch according to the present invention does not employ an electrically actuated switching mechanism to break the electrical connection between the electrical power source and the wiring systems but utilizes a pressure-actuated switching mechanism of a mere mechanical structure. Thus, the switch not only provides the safety system with a reliable operation but also avoids the use of any electric power-driven mechanism which will increase the cost of manufacture. In addition, it is rarely that a safety system of the kind specified is required to operate. The system, therefore, should surely operate whenever required. For this purpose, the system is required to have an arrangement and structure which is very reliable.

The safety system of the present invention and, especially, the electric switch utilized therein, will satisfactorily meet with this requirement because the switch of the present invention advantageously employs merely mechanical arrangement and structure for the necessary operation.

Further objects, features and advantages of the present invention will be made apparent from the following description of a preferred embodiment of the invention with reference to the accompanying drawings.

DESCRIPTION OF A PREFERRED EMBODIMENT

Figure 1:
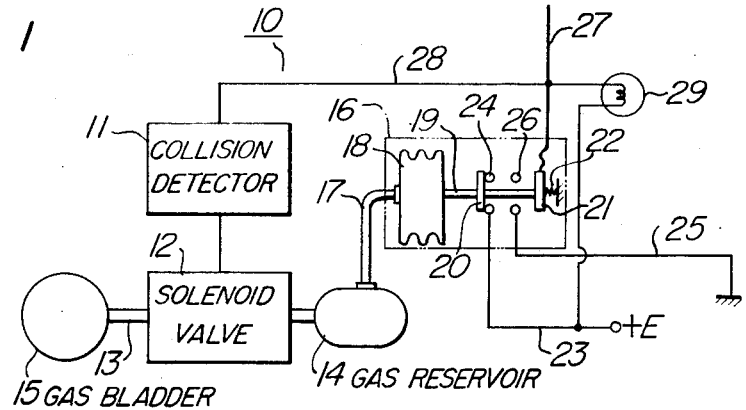
FIG. 1 diagrammatically illustrates the system according to a preferred embodiment of the present invention when the system is in a position in which the gaseous pressure source for the system is at a predetermined pressure value.

Referring first to FIG. 1 of the drawings, there is diagrammatically illustrated a system, according to a preferred embodiment of the invention, for protecting vehicle driver and passengers from being driven against rigid portions in the compartment of a vehicle and for preventing short circuits in the wiring system thereof to guard against accidential fires in the event of a collision of the vehicle with another vehicle or stationary object. The system according to the present invention is generally indicated at 10 and includes means 11 for detecting or predicting a collision of an associated vehicle with another vehicle or a stationary object. The collision detecting means 11 may be any conventional one such as one disclosed in the above-mentioned patent application.

The collision detecting means 11 is electrically connected to a solenoid valve 12 which is provided in a conduit or pipe line 13 communicating a reservoir 14 containing a pressurized gas and a gas bladder 15 which is inflatable by the gaseous pressure from the reservoir 14 in the event of a collision to protect the driver or operator and the passengers from being driven by inertia against rigid objects in the compartment of the vehicle. The solenoid valve 12 is designed to be closed until it receives from the collision detector 11 an electrical signal which represents the risk of a collision. The gas bladder 15 may be any conventional one such as one disclosed in the above-mentioned patent application.

The system 10 of the invention also includes a fluid pressure-actuated electric switch 16 which is pneumatically connected by a second conduit or pipe line 17 to the gas reservoir 14 so that the switch 16 is operative in response to variation in the gaseous pressure in the reservoir. More specifically, the switch 16 has a bellows member 18 which is connected at one end with the gas reservoir 14 through the conduit 17 so that the bellows member is always in fluid-flow communication with the gas reservoir. The bellows member 18 is mechanically connected at the other end to a coaxial rod 19 which is axially movable in response to or by the axial expansion and collapse of the bellows member 18. The rod 19 has thereon first and second axially spaced electrical contacts 20 and 21. The rod 19 is always biased leftwards, as viewed in FIG. 1, against the gaseous pressure within the bellows member 18 and thus the bellows member 18 by means of a compression spring 22.

A lead line or conductor 23 is electrically connected at one end to the positive electrode (+) of a battery mounted on the vehicle. The conductor 23 is connected at the other end with a fixed annular terminal 24 extending around and spaced radially from the portion of the rod 19 adjacent the first electrical contact 20. A second or earthed conductor 25 is connected to a second fixed annular terminal 26 extending around and spaced radially from the portion of the rod 19 adjacent the second electrical contact 21. The second contact 21 is connected with a third conductor 27 through which electric power is supplied to various electrical components of the vehicle, such as a starter. A further conductor 28 is provided between the conductor 27 and the collision detector 11.

The system of the present invention further includes a warning lamp 29 which is electrically connected to the conductors 23 and 27 and which is adapted to be automatically switched on when the gaseous pressure within the reservoir 14 is less than a predetermined value to thereby warn the vehicle operator of that fact.

Figure 2:
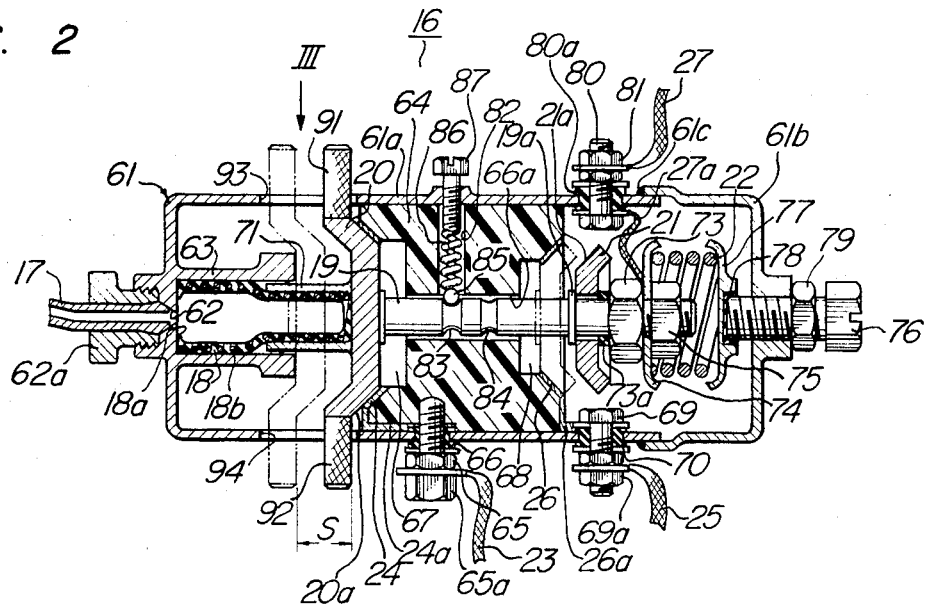
FIG. 2 is an axial sectional view of the gaseous pressure-actuated electrical switch employed in the system shown in FIG. 1.

The switch 16 will be described in more detail with reference to FIG. 2 of the drawings. The switch comprises a substantially closed cylindrical casing 61 consisting of a pair of generally cup-shaped casing parts 61a and 61b secured together at their open ends by any conventional securing means such as welding 61c. The casing part 61a is formed in its closed end with a port 62 to which the pipe line 17 is connected by means of a connector 62a. The casing part 61a has an integral annular wall or cylinder 63 positioned coaxially with the port 62 and projecting inwardly from the end wall of the casing part 61a.

A block 64 of an electrically insulating material having an axial dimension less than that of the switch casing 61 is snugly received in the casing part 61a and fixed to a substantially axially central section of the casing 61 by means of a bolt 65 extending radially inwardly through an opening in the peripheral wall of the casing part 61a and screwed into the block 64. A sleeve 66 of an electrically insulating material extends around the stem of the volt 65 for the reason to be made apparent later. The block 64 is provided with a central axial bore 66a through which the rod 19 axially slidably extends. The opposite end faces of the block 64 are formed therein with axially outwardly opening recesses 67 and 68 coaxial with the bore 66a, respectively. The recesses 67 and 68 have radially and axially outwardly converging frustoconical surfaces to which the annular terminals 24 and 26 are secured, respectively. The terminal 24 is electrically connected by a conductor 24a to the bolt 65 which in turn is electrically and mechanically connected by a nut 65a to the conductor 23. The other terminal 26 is connected by a conductor 26a to a bolt 69 extending radially outwardly through an opening in the portion of the peripheral wall of the casing part 61a adjacent that end face of the block 64 in which the recess 68 is formed. The bolt 69 is electrically and mechanically connected by a nut 69a to the conductor 25. A sleeve 70 of an electrically insulating material extends around the bolt 69 as in the case of the electrically insulating sleeve 66.

The first electrical contact 20 on the rod 19 is of a generally dish-like shape having a frusto-conical peripheral surface region 20a at least a part of which is adapted to be brought into abutment contact with the frusto-conical terminal 24 secured to the left end face of the block 64. The dish-like contact 20 has an axially outwardly facing surface to which is rigidly secured a cylinder 71 in coaxial and telescopic relationship with the cylinder 63. The cylinder 71 is sized and shaped such that at least the free end portion thereof is snugly received in and slidably extends into the cylinder 63 so that the cylinders 63 and 71 cooperate together to define a substantially confined but axially expansible cylindrical chamber in which the axially expansible bellows member 18 is snugly received. It will be appreciated that the outer end of the bellows member 18 is formed with an opening 18a which is axially aligned with the port 62 in the end wall of the casing part 61a so that the bellows member is always in fluid-flow communication with the gas reservoir 14 through the opening 18a, port 62 and conduit 17. It will also be appreciated that at least the peripheral edge portion of the opening 18a is sealingly connected or secured to the end wall of the casing part 61a so as to prevent pressure leakage. The cylinders 63 and 71 are operative to radially inwardly support or back up the bellows member 18 against excessive radial expansion thereof due to the gaseous pressure from the reservoir 14 while the cylinder 71 and the dish-like electrical contact 20 are axially movable a distance S together with the rod 19 toward and away from the cylinder 63 in response to the axial expansion and/or contraction or collapse of the bellows member 18. The arrangement is such that, when the gaseous pressure in the reservoir 14 is at a predetermined value or more, the bellows member 18 is axially expanded sufficiently to keep the dish-like electrical contact 20 in abutment contact with the annular electrical terminal 24 on the frusto-conical surface in the left end face of the block 64.

The bellows member 18 includes a resilient spiral member or coil spring 18b embedded in the peripheral wall thereof. The spring 18b is designed to reinforce the bellows member 18 against the pressure therein and cooperate with the spring 22 to collapse the bellows member immediately when the pressure therein is lowered below a predetermined value. For this purpose, the spring 18b is under tension when the bellows member 18 is expanded.

The second electrical contact 21 on the rod 19 is also of a dish-like shape and is rigidly mounted on the rod 19 by means of a flange 19a, a nut 73 screwed over the threaded right end portion of the rod 19 and tightened against a ring or washer 73a interposed between the dish-like contact 21 and the nut 73, said flange 19a being rigidly secured to the rod 19. The second electrical contact 21 also has an axially inwardly and radially outwardly directed frusto-conical peripheral surface region 21a at least a part of which can be brought into abutment contact with the frusto-conical terminal 26 on the block 64.

A dish-shaped spring retainer 74 is rigidly mouneted on the right end portion of the rod 19 by means of the nut 73 and another nut 75 screwed over the right end portion of the rod 19 and tightened against the retainer 74. A screw 76 threadably extends axially through a threaded hole in the closed end wall of the casing part 61b and is positioned in axial alignment with the rod 19. A second dish-like spring retainer 77 is mounted on the inner end of the adjusting screw 76 for rotation relative to the screw. The spring 22 is interposed under compression between the first and second spring retainers 74 and 77. A generally cup-shaped member 78 of an electrically insulating material is advantageously interposed between the second spring retainer 77 and the inner end of the screw 76 so as to electrically insulating the switch casing 61 from the rod 19. The screw 76 is provided to adjust the initial load on the compression spring 22 and is adapted to be fixed in an adjusted position by means of a check nut 79.

An electrical conductor 27a is clamped at its inner end between the nut 73 and the spring retainer 74 so that the conductor 27a is electrically connected to the rod 19. The outer end of the conductor 27a is electrically connected to the conductor 27 by means of a unit of bolt 80 and a nut 81, the bolt 80 extending radially outwardly through an opening in the peripheral wall of the casing part 61a. An electrically insulating sleeve 80a is provided to extend around the shank of the bolt 80 for electrically insulating the switch casing 61 from the bolt 80.

The frusto-connical electrical contact 21 is movable with the rod 19 into and out of electrically conductive contact with the frusto-conical terminal 26 on the right end face of the block 64. The arrangement is such that, when the first electrical contact 20 is in contact with the first terminal 24, the second electrical contact 21 is spaced axially outwardly or rightwardly from the second terminal 26 a distance equal to the distance S.

A bore 82 extends radially inwardly through the material of the block 64 and is opened to the axial bore 66a therein. A pair of annular grooves 83 and 84, each of a semi-circular axial section, are provided in the peripheral surface of the rod 19 and are axially spaced from each other a distance equal to the distance S. The arrangement is such that, when the first electrical contact 20 is in contact with the terminal 24, the groove 83 is in registration with the radial bore 82, while the other groove 84 is brought into registration with the bore 82 when the second electrical contact 21 is moved into contact with the terminal 26. A rigid ball 85 preferably of a metal is resiliently urged into one of the grooves 83 and 84 by a compression spring 86 extending within the bore 82. A second adjusting screw 87 threadably extends through the peripheral wall of the casing part 61a into the radial bore 82 in the block 64. The screw 87 is adapted for adjusting the initial load imparted to the compression spring 86 and thus to the ball 85 through which the load is exerted radially inwardly to a registered one of the annular grooves 83 and 84. The adjusting screw 87 is preferably made of an electrically insulating material so that the screw 87 and thus the casing part 61a are electrically insulated from the rod 19. The screw 87 also serves to position and support the block 64 in axial direction of the block.

The initial load on the compression springs 22 and 86 are determined according to that amount of the gaseous pressure within the reservoir 14 and thus the bellows member 18 which is required to cause the system to surely start the aimed operation to guard the vehicle driver and passengers in a shorter period of time such as several tens of milli-seconds, and according to the force of the annular grooves 83 and 84 in the rod 19 which lifts up the ball 85 against the spring 86. Specifically, when the pressure within the reservoir 14 and thus the bellows member 18 becomes less than a predetermined value, the spring force of the compression spring 22 actuates the rod 19 left-ward against the force of the compression spring 86 which urges the ball 85 against the concave surface of the annular groove 83 and the rightward force by the gaseous pressure within the bellows member 18. When the ball 85 has been lifted up from the bottom of the groove 83 due to the initial slight leftward movement of the rod 19, the spring 22 is then required to exert a reduced leftward force to the rod 19 so that the same is further moved leftwardly until the second annular groove 84 is brought into registration with the ball 85. Thus, the ball 85 is forced by the compression spring 86 into the groove 84 so that the movement of the rod 19 is stopped. Stated in other words, the parts 83 – 87 cooperate together to form a mechanism which provides the switch 16 with a hysteresis property which eliminates an unstable state which will otherwise be produced when the pressure forces of the spring 22 and the bellows member 18 are nearly balanced with one another. The screws 76 and 87 are adjusted to set the switch 16 so that the above-described operation is obtained when the working pressure source is at a predetermined value.

Figure 3:
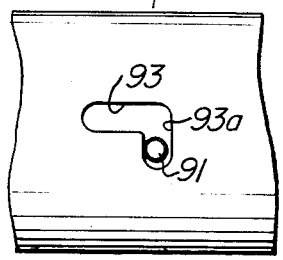
FIG. 3 is a fragmentary top view of the casing of the switch as viewed in a direction indicated by an arrow III in FIG. 2.

The dish-like electrical contact 20 has a pair of diametrically opposed projections or handles 91 and 92 of an electrically insulating material rigidly secured to the peripheral surface of the contact 20. The handles 91 and 92 extend radially outwardly and loosely through axially elongated openings or slots 93 and 94 formed in the peripheral wall of the switch casing part 61a. The slots 93 and 94 are positioned and sized such that the handles 91 and 92 are allowed to move axially of the switch 16 along the slots when the electrical contact 20 is axially moved together with the rod 19. In addition, the slot 93 is provided at the axially inner end thereof with a circumferentially extending portion 93a, as will be seen in FIG. 3, so as to allow the associated handle 91 to be moved circumferentially into locking engagement with the slot portion 93a for the purpose to be described later. The other slot 94 has a similar shape though not illustrated in the drawings.

A description will then be made with respect to the operation of the afore-described pressure-responsive electric switch. The bellows member 18 is fully expanded in the chamber defined by the cylinders 63 and 71 when the reservoir 14 contains a gas under a predetermined pressure such as more than 100 atm., as described in the above, so that the cylinder 71 is moved leftwards with the electrical contact 20 and rod 19 with respect to the other cylinder 63 by the gaseous pressure in the bellows member 18 against the compression spring 22 to keep the contact 20 in electrically conductive contact with the terminal 24 and to allow the ball 85 to be held projecting into the annular groove 83. In this position of the switch 16, the electric current is passed from the battery through the conductor 23, terminal 24, rod 19 and conductors 27a and 27 to various electrical components of the associated vehicle. The electrical power is also supplied to the collision detector 11. All of the electric components are in normal operation. Under this condition, since the electrical resistance of the wiring systems positioned between the battery and the various electrical components is much smaller than that of the warning lamp 29, the same is not lightened. If a collision takes place when the switch is in the described position, the collision detector 11 operates to emit a signal which represents the collision. This signal is applied to the solenoid valve 12 to open the same so that the gas under pressure is allowed to flow from the reservoir 14 through the conduit 13 to the gas bladder 15 for thereby expanding the same. The expansion of the bladder is completed in a shorter period of time such as several tens of milliseconds, with a result that the pressure within the reservoir 14 is greatly lowered substantially to atmospheric pressure. Since the bellows member 18 is in communication with the gas reservoir 14 through the conduit 17, the bellows member is subjected to a presssure variation similar to that in the reservoir 14. In other words, if a collision signal is produced and is fed to the solenoid valve 12 so that the same is opened, the gaseous pressure in the bellows member 18 is suddenly lowered bellow the predetermined value to thereby allow the rod 19, which has previously been biased rightwardly by the gaseous pressure within the bellows member 19, to be shifted leftwards by the expansion of the compression spring 22 so that the electrical contacts 20 and 21 are moved to the positions shown in broken lines in FIG. 2. In this position of the rod 19, the ball 85 projects into the annular groove 84.

Thus, the contact 20 is spaced apart from the terminal 24 so that no electrical power is supplied from the battery to the electrical components of the vehicle. On the other hand, since the rod 19 is moved leftwards by the spring 22 to cause the other or second electrical contact 21 to be brought into pressure contact with the terminal 26, all of the electrical components are earthed through the conductor 25. Thus, even if the engine continues its operation and the generator is driven thereby to generate an electrical power after the electrical supply from the battery to the various electrical components is interrupted, the electrical power thus generated will be completely discharged. As such, when a collision takes place, not only the gas bladder is immediately expanded but also the switch 16 is suddenly responsive to the pressure drop within the gas reservoir 14 to break the electrical connection between the battery and the electrical components of the vehicle as well as to earth these electrical components.

In general, a prior art system of this kind is not operable to protect the driver and passengers in the event of a collision if the pressure source for the system is at a pressure which is below a predetermined value. With the system of the present invention, however, the associated vehicle cannot start if the pressure in the gas reservoir 14 is accidentally lowered below a predetermined pressure value because, under such condition, the electrical switch 16 switches off the electrical components of the vehicle such as a starter from the electrical power source or battery. In this condition, moreover, the electrical power from the battery is supplied to the warning lamp 29 whose output is of the order of several watts which is far greater than the electrical resistance by the other electrical components on the vehicle, with a result that the electrical power from the battery is consumed solely by the lamp 29. In other words, the lamp 29 is lightened for the first time when the other electrical components are switched off the power source to thereby inform the operator of a fact that the pressure in the gas reservoir 14 is lowered below the predetermined value. Therefore, the operator not only can be advised of the pressure drop of the gaseous pressure source but also is unable to start the vehicle even if he inadvertently attempts to do so. Thus, the system according to the present invention can avoid a possibility that vehicle driver and passengers are otherwise subjected to a risk that the system is inoperable to protect them in the event of a collision. It will be appreciated that, even if the gaseous pressure is lowered during operation of the vehicle, the warning lamp 29 is lightened to warn the operator of such fact. Moreover, if the operator wants very much to operate the vehicle under such condition for some reasons, he may manually move the handles 91 and 92 axially rightwards along the slots 93 and 94 against the compression spring 22 and then rotate the handles about the axis of the rod 19 into locking engagement with the circumferential slot portions 93a and 94a (not shown) so that the electrical contact 20 is moved into and kept in contact with the terminal 24 to allow the electrical power to be supplied from the battery to various electrical components of the vehicle such as a starter.

In the illustrated embodiment of the invention, the warning lamp is not lightened when the vehicle is started and operated by manually resetting the electric switch 16 in the manner described. The system, however, may be equipped with another warning means which is energized when the switch 16 is manually reset, or in other words, when the handles 91 and 92 are in locking engagement with the slot portions 93a and 94a. The system of such an arrangement will enable the driver to operate the vehicle while he is advised of the pressure drop within the gas reservoir 14.

Morever, the bellows member 18 of the illustrated embodiment is relatively complicated in structure. This is because the bellows is designed to withstand a gas under higher pressure, for example, more than 100 atm. It will be appreciated that a decompression means may be disposed in the pipe line 17 leading to the bellows member 18 so as to make it possible for the latter to be of a simplified construction. Alternatively, the bellows member 18 may be replaced by a disphragm.

Further more, the warning lamp 29 may be replaced by any other similarly operable means such as a buzzer. Still further, the manually resetting mechanism and the structure of the electrical contacts may have modified arrangement and structure within the spirit and scope of the present invention defined in the annexed claims.

What is claimed is

1. A safety system for vehicle driver and passengers, said system including a reservoir containing a pressurized fluid; an inflatable gas bladder; a conduit extending between said reservoir and said gas bladder, means for detecting a collision of the vehicle with another object; valve means in said conduit electrically connected to said collision detecting means, the latter being adapted to emit an electrical signal in the event of a collision, said valve means being adapted to be opened in response to such electrical signal to allow the pressurized fluid to flow from said reservoir through said valve means to said gas bladder so that the same is inflated to protect the driver and passengers; an electric switch means including a first pair of electrical contacts one of which is electrically connected to the electrical power source of said vehicle, the other contact being movable between a first position in which said other contact is in electrically conductive engagement with said one contact and a second position in which said the other contact is spaced apart from said one contact, a second pair of electrical contacts one of which is electrically connected to a first earthed conductor, the other contact of said second pair being electrically connected to a second conductor leading to wiring system of said vehicle and electrically and mechanically connected to said the other contact of said first pair for movement therewith into and out of electrically conductive engagement with said one contact of said second pair, said the other contact of said first pair being normally in said first position to allow electrical current to flow from said power source through said second conductor to said wiring systems; means in fluid-flow communication with said reservoir and responsive to variation in the pressure therein to move said other contact of said first pair from said first position to said second position to thereby break the electrical connection between said power source and said wiring systems and cause the latter to be earthed through said first conductor; and electric warning means provided in parallel with said switch means and electrically connected to said second conductor and said electrical power source, said warning means being adapted to produce a warning signal when said first pair of contacts are in said second position.

2. A safety system as claimed in claim 1 in which said pressure variation responsive means is an axially expansible bellows member having one end face in abutment contact with said other contact of said first pair of contacts, said bellows member being normally in its fully expanded position to hold said other contact of said first pair in abutment contact with said one contact of said first pair, said other contact of said first pair being connected to said the other contact of said second pair of a rod member axially extending therebetween, means biasing said rod together with said the other contacts of said first and second pairs of contacts toward said bellows member, said biasing means causing said rod to be moved toward said bellows member when the pressure therein is lowered below a predetermined value so that said bellows member is collapsed at least partially by the force of said biasing means.

3. A system as claimed in claim 2 in which said warning means comprise a lamp.

4. A safety system as claimed in claim 3 in which said electric switch means further includes a substantially closed hollow casing enclosing said electrical contacts and said bellows member, the latter having its other end face secured to one end of the closed ends of said casing.

5. A safety system as claimed in claim 2 in which said bellows member includes turns of resilient spiral member embedded in the peripheral wall of said bellows member, said spiral member being operative to reinforce said bellows member against the pressure therein and cooperative with said biasing means to immediately contract said bellows member when the pressure therein is lowered below said predetermined value.

6. A safety system as claimed in claim 2 characterized by means providing said switch with a hysteresis property which eliminates an unstable state which will otherwise be produced when the pressure forces of said bellows member and said biasing means are nearly balanced with each other.

7. A safety system as claimed in claim 6 in which said hysteresis property providing means comprises a pair of recesses in the peripheral surface of said rod member and spaced a distance axially of said rod, said distance being equal to the movement of said the other contact of said first pair between said first and second positions, a ball of a rigid material and a compression spring urging said ball into one of said recesses.

8. A safety system as claimed in claim 7 in which means are provided for adjusting the initial load on said compression spring.

9. A safety system as claimed in claim 2 in which said biasing means comprises a compression spring.

10. A safety system as claimed in claim 9 in which means are provided for adjusting the initial load on said compression spring.

11. A safety system as claimed in claim 4, characterized by means manually operable to move said other contacts of said first and second pairs of electrical contacts from their second positions to first positions and means for locking said the other contacts in said second positions.

12. A safety system as claimed in claim 11 in which said manually operable means comprises at least one handle rigidly secured to one of said other contacts of said first and second pairs and projecting therefrom radially outwardly through an opening in the peripheral wall of said casing.

13. A safety system as claimed in claim 12 in which said opening has a hook-like shape providing axially and circumferentially extending portions, said handle being adapted to be moved into locking engagement with said circumferentially extending portion of said opening to hold said the other contact of said first pair in abutment contact with said one contact of said first pair.

14. A safety system as claimed in claim 4, characterized by a substantially cylindrical block of an electrically insulating material received in and secured to said casing, said block having its opposite ends axially inwardly spaced from the closed ends of said casing to cooperate therewith to define a pair of spaces adjacent the opposite ends of said casings, respectively, said block being provided with an axially extending bore through which said rod slidably extends, said one contacts of said first and second pairs being substantially in the form of rings secured to the opposite ends of said block, respectively, each of said the other contacts of said first and second pairs being substantially in the form of a disc axially movable into and out of contact with one of said contact rings.

15. A safety system as claimed in claim 4 in which the end of said casing adjacent said first pair of contacts has a substantially cylindrical hollow member connected thereto at one end and extending axially inwardly toward said the other contact of said first pair, said the other contact of said first pair having a substantially cylindrical second hollow member connected thereto at one end and extending axially outwardly therefrom in closely spaced telescopic relationship with said first hollow member to cooperate therewith to define a closed chamber in which said bellows member is received.

16. A safety system as claimed in claim 8, in which said means for adjusting said compression spring comprises an adjusting screw threadably extending radially inwardly through the peripheral wall of said casing.

17. A safety system as claimed in claim 10 in which said means for adjusting said second compression spring comprises an adjusting screw threadable extending through the end wall of said casing adjacent said compression spring.

\* \* \* \* \*